UNITED STATES PATENT OFFICE.

EDUARD SIEFERT-SCHWAB, OF NEUNKIRCHEN, AUSTRIA-HUNGARY.

PROCESS FOR PRODUCING SOLUTIONS OF INSOLUBLE GUMS.

1,066,852. Specification of Letters Patent. Patented July 8, 1913.

No Drawing. Application filed October 29, 1912. Serial No. 728,459.

*To all whom it may concern:*

Be it known that I, EDUARD SIEFERT-SCHWAB, subject of the King of Spain, residing at Neunkirchen, Lower Austria, Austria-Hungary, have invented certain new and useful Improvements in the Process for Producing Solutions of Insoluble Gums, of which the following is a specification.

The so-called insoluble gums, which in contra-distinction to the soluble gums, such as gum Senegal "cordofan" gum, "Ghatti" gum and the like only swell in cold water without ever dissolving in the same, may be divided into two groups, one group comprising those gums which possess neutral or practically neutral reaction, such as Bassora gum, and the other those of a pronounced acid character, such as Indian tragacanth. Those gums which reveal a neutral or practically neutral reaction, remain perfectly insoluble even when boiled for some considerable time in pure water, but can be dissolved by prolonged boiling when mineral acid is added. Those insoluble gums which are of a pronounced acid character (particularly Indian tragacanth) are gradually dissolved when boiled for some considerable time in pure water in an open boiler or for a shorter time in an autoclave, which however, has the disadvantage that they become more and more diluted by continued boiling. This dilution of the already dissolved gum particles renders it impossible to obtain a thick solution suitable for dressing purposes, as the solution of the gum particles progresses from the outside inwardly, and the gum particles which were first dissolved have already entered the stage of liquefaction when the inner gum particles have just begun to be dissolved. This drawback is not remedied by an extensive comminution of the gum mass, because the pulverulent particles adhere together in the boiler and form a compact mass. Similarly ineffective is the already attempted addition of peroxid of hydrogen, as the presence of the latter not only accelerates the dissolving but also practically to the same extent hastens the liquefaction or dilution of the dissolved particles. The addition of mineral acids, however, has no influence whatever on the dissolution conditions of the acid reacting gums. It has been found that this dilution of the already dissolved gum is prevented wholly or for the greater part if hydroxids of alkali and alkaline earth metals, or substances acting similar to these, such as carbonates, are added to the water used for the dissolving of the gum. The maximum effect is obtained if these substances are added in such quantities that the end product is just neutral. It is, however, sufficient to employ also smaller quantities in order to considerably retard further dilution. This thickening effect of the alkalis on Indian tragacanth, on which effect this invention is based, has nothing to do with the well known dissolving action of the alkalis on the insoluble parts of genuine tragacanth, (which in every respect differs from Indian tragacanth) and of the gums possessing only a weak acid reaction.

Indian tragacanth to which the new process is chiefly to be applied distinctly differs from genuine tragacanth and the other kinds of gums. All the latter possess the well known phloro-glucinol reaction (consisting in the red coloring on boiling with hydrochloric acid and phloro-glucinol) which reaction is only about in the Indian tragacanth. This fact clearly points to a substantially different chemical constitution. Whereas further the genuine tragacanth contains starchy substances or particles, the same are entirely absent in Indian tragacanth. The latter is further characterized by its great acidity when compared with all other kinds of gums and tragacanth. Finally also the dissolving capacities of these substances are absolutely different. A characteristic feature of Indian tragacanth is that it is insoluble in cold water, whereas it easily dissolves when boiled without it being necessary to make any additions of the substances. The other kinds of gums and tragacanth behave quite differently in this respect. This solution of Indian tragacanth obtained by boiling is as already hereinbefore mentioned too thin particularly for textile purposes, and the invention consists in the addition of substances with an alkaline reaction to the gum before its dissolution by which means a thick solution is obtained.

In order to more fully describe the improved process reference is made to the following examples:

Example I: 1 kg. of caustic soda is dissolved in 100 liters of water, in which 10 kgs. of comminuted Indian tragacanth is allowed to swell, whereupon the same is boiled in an open boiler or an autoclave until it forms a solution.

Example II: The caustic soda is replaced by 1 kg. of calcium hydroxid, the remainder of the procedure being the same as described in connection with Example I.

Having now particularly described and ascertained the nature of my said invention and in what manner the same is to be performed, I declare that what I claim is:

A process for producing solutions of insoluble gums possessing an acid reaction by boiling in water, which consist in adding non-oxidizing substances having an alkaline reaction, to the water.

In testimony whereof I affix my signature in the presence of two witnesses.

EDUARD SIEFERT-SCHWAB.

Witnesses:
FRIEDRICH BINDER,
AUGUST FUGGER.

Copies of this patent may be obtained for five cents each, by addressing the "Commissioner of Patents, Washington, D. C."